United States Patent
Tsai

(10) Patent No.: US 6,249,422 B1
(45) Date of Patent: Jun. 19, 2001

(54) CAPACITOR MODULE FOR CAR AUDIO SYSTEM

(75) Inventor: Liao-Tai Tsai, Taipei (TW)

(73) Assignee: Real Power Cap Company, Taipei (TW)

( * ) Notice: Subject to any disclaimer, the term of this patent is extended or adjusted under 35 U.S.C. 154(b) by 0 days.

(21) Appl. No.: 09/496,267

(22) Filed: Feb. 1, 2000

(51) Int. Cl.[7] .................................................. H01G 4/00
(52) U.S. Cl. ..................... 361/301.3; 361/520; 361/538; 361/541; 361/522
(58) Field of Search ............................. 361/301.3, 306.1, 361/328–329, 517–520, 522, 535–538, 540–541; 174/17 R, 135, 58; 248/906; 439/535; 220/3.2, 4.02, 3.8

(56) References Cited

U.S. PATENT DOCUMENTS

| 4,803,598 | * | 2/1989 | Efford et al. ......................... 361/541 |
| 5,548,473 | * | 8/1996 | Wang ................................. 361/301.1 |
| 5,679,033 | * | 10/1997 | Eavey et al. ......................... 439/801 |

* cited by examiner

Primary Examiner—Anthony Dinkins
(74) Attorney, Agent, or Firm—Birch, Stewart, Kolasch & Birch, LLP

(57) ABSTRACT

A capacitor module capable of forming assembly of capacitors is disclosed. The capacitor is contained into a housing and the housing has a male connector and a female connector formed on the opposite sides thereof. The housings can combine each other by the engagement of the male and female connectors so as to achieve the housing assembly. After that, link bars are used to connect the corresponding electrodes of each capacitor, and a cover and a base are mounted on the top and the bottom of the capacitor module.

8 Claims, 4 Drawing Sheets

CAPACITOR MODULE FOR CAR AUDIO SYSTEM

BACKGROUND OF INVENTION

1. Field of the Invention

The present invention relates generally to capacitors for a car audio system. More particularly, the present invention relates to a capacitor module which is capable of forming assembly of the capacitors for car audio system.

2. Description of Related Art

The power system of a car is normally supplied by car batteries. However, there always needs more power to meet the requirement of large current of the car audio system; otherwise, the performance of the audio quality can not be presented. Therefore, there are capacitors connected in parallel installed between the amplifier and the batteries of car audio system to output extra current when high power is required.

Capacitors can be charged, and discharge in short time if it is necessary for supporting power output. Thus, they are generally equipped on the cars to supply sufficient power to the amplifier of car audio system, especially at the situation for the car audio system demanding large current such as performing a super bass melody. Moreover, the installation of capacitors can also enhance the bass response of car audio system. On the other hand, the installation of capacitors can filter signal. When the amplifier is connected with the power source, it usually simultaneously generates zigzag wave signal. The zigzag wave signal then causes some audible noise in the audio system; therefore, affects the voice quality. The use of capacitors can prevent the above problem.

Typically, it is not enough for only one capacitor to satisfy the watt power requirement for car audio system. Usually, a plurality of capacitors connected in parallel are prepared by constructing a link bar therebetween. There are at least two through holes formed at both ends of the link bar to fit the corresponding electrodes of two capacitors to connect them in parallel. However, the conventional link bar is designed with fixed number of through holes, and can not be overlapped each other for assembly. As a result, the manufacturers have to produce various types of link bars having different number of through holes to meet the requirement for connecting different number of capacitors. For example, when a user has two capacitors for car audio system, he or she has prepared a pair of two-hole link bars. Each two-hole link bar is mounted on one electrode (anode or cathode) of both two capacitors respectively and then two bolts is screwed to lock the link bar onto the capacitors. Nevertheless, as the user would like to connect three capacitors by adding one thereof, the two-hole link bars are useless. Overlapping two two-hole link bars to connect three capacitors will cause an unstable connection. It is because one end of the overlapping link bar is higher than the other end such that the link bar can not match to the surface of the capacitors for bolts to be screwed tightly. Hence, a three-hole link bar is selected. The three-hole link bar with two through holes on both ends and one on the middle can fit mounting on corresponding electrodes of each three capacitors. Of course, user can connect more capacitors by adding another capacitors; however, he or she has to select a specific link bar with the same number of through holes. That is, the assembly of the capacitors is inconvenient by using the conventional link bars for connection. Moreover, a high cost for manufacturing various types of link bars is another problem.

Furthermore, when the capacitors are fixed to the car, due to the cylindrical shape, brackets or other kinds of fixers are used to fasten the bottom and middle portions thereof. The brackets are then fixed on the car. However, the surface of capacitor, on which indicating figures and text are printed, will be partially covered by the bracket or fixer. It will cause an inconvenience of reading the notice and warning messages shown by the figures and text. Meanwhile, it is also inconvenient for the assembly of capacitors by utilizing the brackets. Because the capacitors are not all the same size in diameter, it has to choose appropriate brackets to match them together. Next, because the capacitors and the brackets are separated, it needs two steps to firstly fix the brackets on the car and secondly combine the capacitors with the brackets.

Except the above-mentioned inconvenience, the brackets and the capacitors are two individual elements, though they can be combined firmly. Under the continually and perpetually shaking by the moving of car, it is possible to cause a division between the bracket and the capacitor or the bracket and the car after a period of time.

Last, when the capacitors are fixed on the car, there is still a terminal to connect the electrical wire of car audio system by locking the terminal together with the link bar at both ends of parallel capacitors. However, the traditional link bar has arc-shaped end so that the terminal can not fully contact therewith. That is, the contact between the terminal and the end surface of the link bar is not by surface to surface; therefore, it might result in a serious trouble that the terminal will move around the bolt because of lacking the against force provided by the link bar. It is dangerous for the short happened if two movable positive and negative terminals are contacted each other.

SUMMARY OF THE INVENTION

Therefore, it is one of the objects of the present invention to provide a capacitor module which is capable of forming assembly of capacitors conveniently.

In the capacitor module, a capacitor is contained into a housing and the housing has a male connector and a female connector formed on the opposite sides thereof. The housings can combine each other by the engagement of the male and female connectors so as to achieve the housing assembly. After that, link bars are used to connect the corresponding electrodes of each capacitor, and a cover and a base are mounted on the top and the bottom of the capacitor module.

Accordingly, the capacitor module provided includes a capacitor having two electrodes; a housing for containing the capacitor, having a male connector and a female connector forming on opposite side thereof so that the other housing is capable of combining with the housing by an engagement of the male/female connector of the housing and the female/male connector of the other housing; and two link bars for connecting the corresponding electrodes of each capacitor.

The engagement of the male connector such as a dovetail slide and the female connector such as a dovetail slot is a dovetail connection. A protrusion link is further provided for connecting the electrodes of the capacitor to extend out of an opening of the cover. Further, in consideration of manufacturing, the housing is preferred made by aluminum material and by extrusion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE PREFERRED EMBODIMENT

Figure 1:
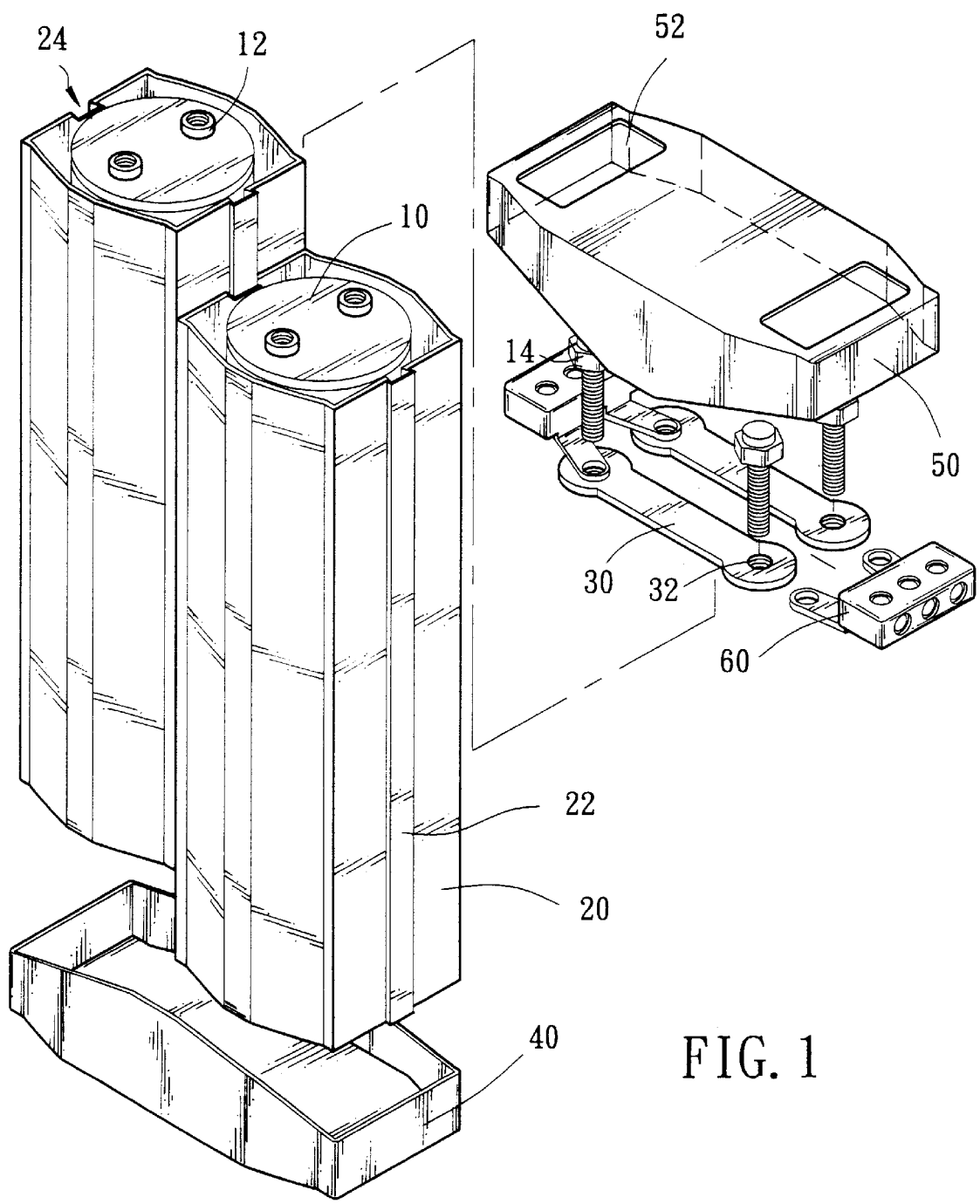
FIG. 1 is an exploded perspective view of a capacitor module for a car audio system according to the present invention.

Please refer to FIG. 1, which shows a preferred embodiment of a capacitor module for a car audio system according to the present invention. As shown in figure, the capacitor module includes a capacitor 10, a housing 20, a link bar 30, a base 40, a cover 50 and a protrusion link 60.

Figure 2:
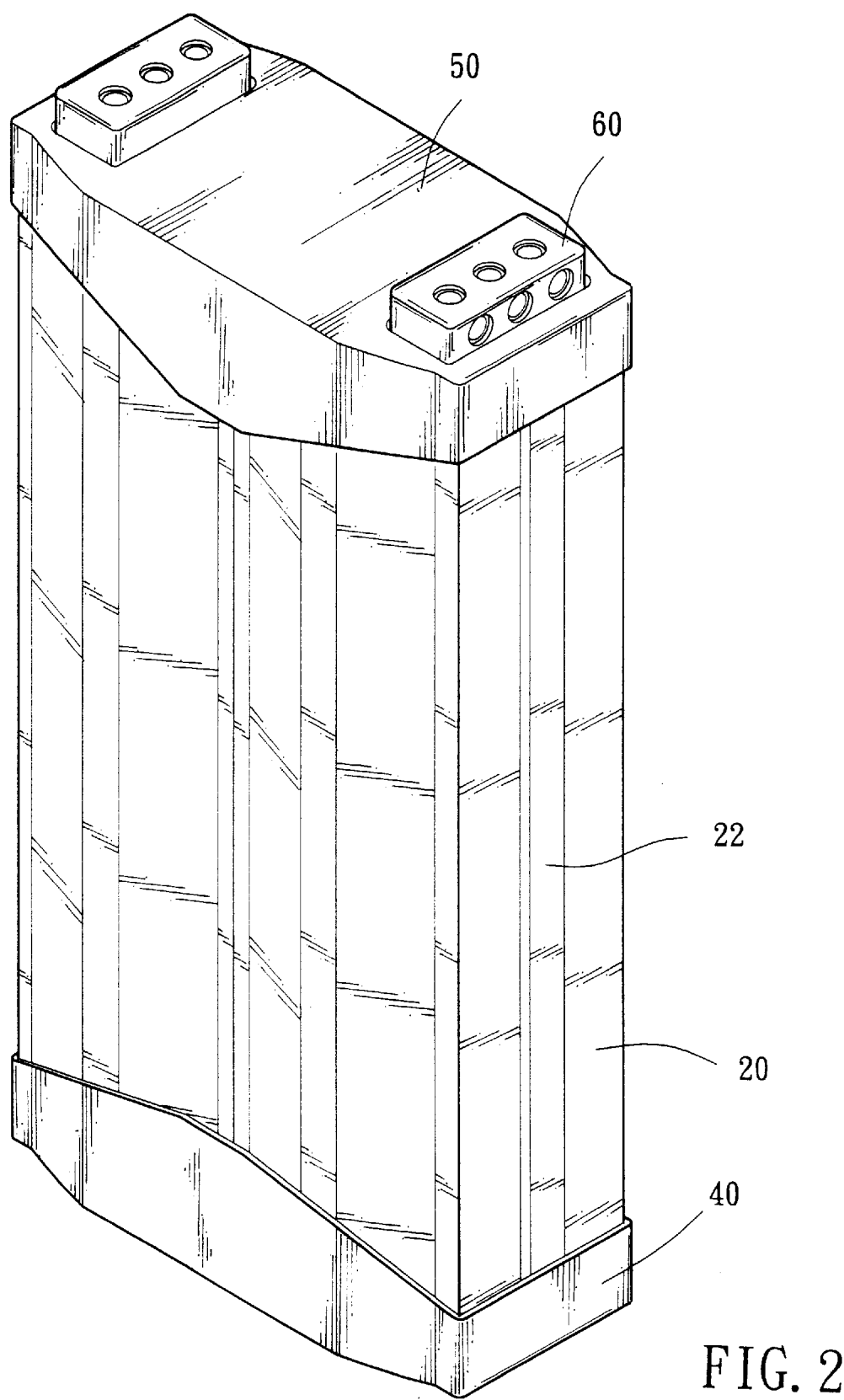
FIG. 2 is an assembled perspective view of FIG. 1.

The capacitor 10 has two electrodes 12, typically has cylindrical shape and has dielectric material filled therein. The capacitor 10 is suitably contained in the housing 20. The housing 20 is made by extrusion such as an aluminum-extruded product. There are windows (not shown) formed on the housing 20 for the indicating figures and text printed on the surface of the capacitor 10 exposed. It is possible for user to read the notice and warning messages shown by the figures and text. The housing 20 has a male connector such as a dovetail slide 22 and a female connector such as a dovetail slot 24 formed on the opposite sides thereof. The dovetail connection in this embodiment makes two housing 20 capable of being combined for each other in a convenient way. Therefore, the capacitor module can be easily constructed by combining the housings 20 by putting dovetail slide 22 into the dovetail slot 24 and having capacitors 10 being contained inside the housings 20 respectively. After that, the corresponding electrodes 12 of each capacitor 10 should be electrically connected. To achieve the object, in this embodiment, a through hole 32 formed on each end of the link bar 30 is aligned to the corresponding electrode 12 of the capacitor 10, and then a bolt 14 is screwed through the hole 32 into the electrode 12 to tightly combine the link bar 30 onto the capacitor 10. The base 40 is mounted under the bottom for holding the capacitors 10 and the housing 20 and the cover 50 is mounted on the top for covering the capacitor 10. The cover 50 has other function to protect the electrodes 12 of the capacitor 10 from contaminant so that the electrode 12 is not exposed. However, when the capacitor module is fixed on the car, there is still a terminal (not shown) to connect the electrical wire of car audio system by locking the terminal together with the link bar at both ends of parallel capacitors. In order to connect the end electrodes of the capacitor module to the terminal, the protrusion link 60 is mounted on the electrodes 12 of the capacitor 10 and through an opening 52, is extended out of the cover 50 for completing the connection. Finally, the assembled perspective view of FIG. 1 is as shown in FIG. 2.

Figure 3:
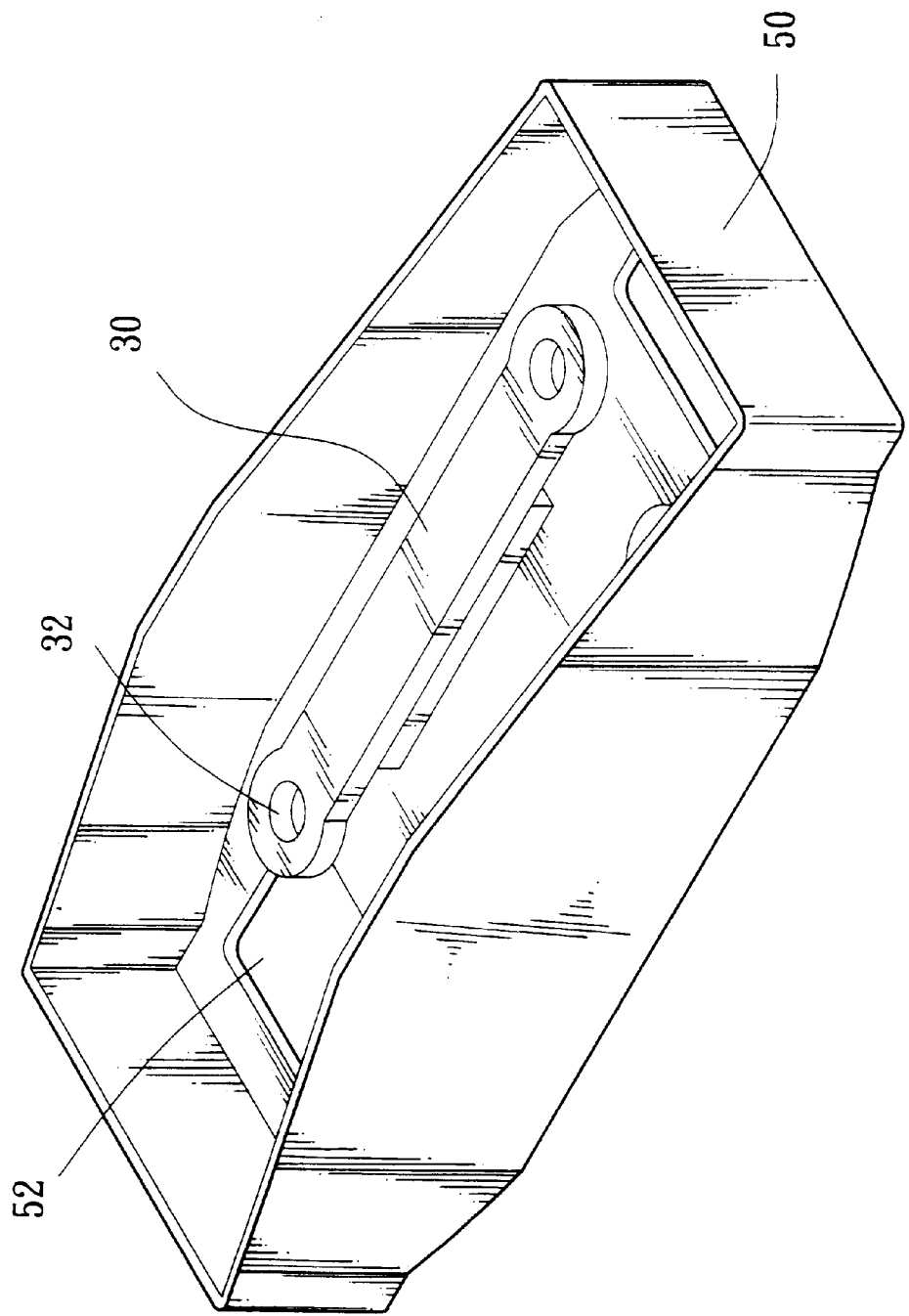
FIG. 3 is a preferred embodiment of a cover of the capacitor module of the present invention.

The link bar 30 for connecting the electrodes 12 of the capacitor 10 can be mounted on the cover 50 instead of being separated from the cover 50 in the above-mentioned embodiment. Referring to FIG. 3 shows the other embodiment of the cover 50 in the capacitor module. The corresponding electrodes 12 of the capacitors 10, which design is different from those shown in FIG. 1, can be connected by directly mounting the cover 50 onto the housing 20. That is, after the cover 50 is mounted, the through hole 32 of the link bar 30 can fit mounting on the electrodes 12. Obviously, the election of the base 40 or the cover 50 depends on the combination numbers of the housings 20. When three housings 20 are combined, the base 40 or the cover 50 is then needed to be substituted.

Figure 4:
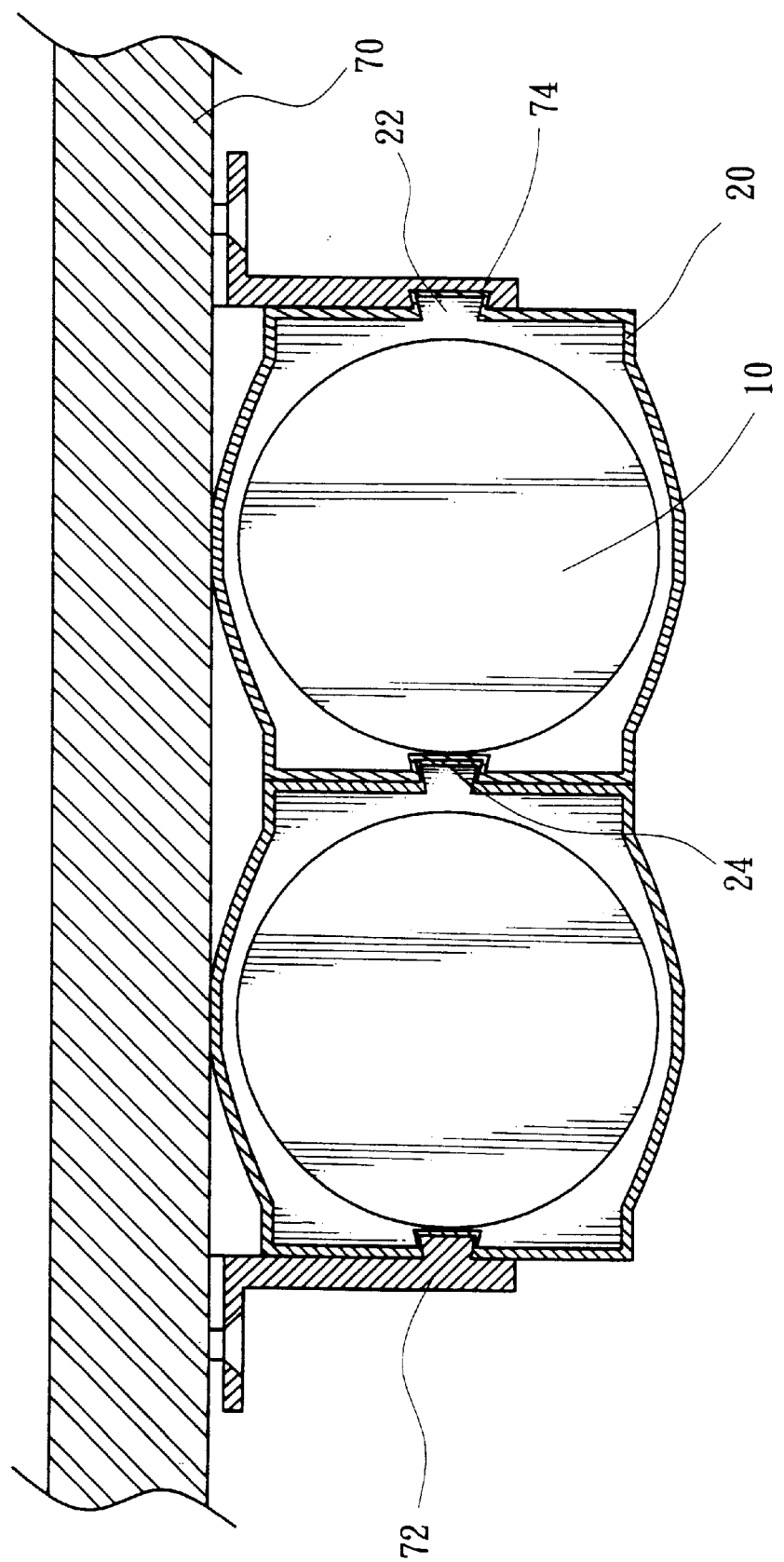
FIG. 4 is a cross-sectional view of the capacitor module of the present invention fixed to the car.

Please refer to FIG. 4, which shows the capacitor module of the present invention fixing to the car. A fixed base 70 has similar dovetail connectors shown in FIG. 1. A dovetail slide 72 and a dovetail slot 74 are formed on each side of the fixed base 70. Further, the fixed base 70 is adjustable for moving one side of the dovetail slot 74 or the dovetail slide 72 so that the dovetail connectors of the fixed base 70 can be suitably furnished with the dovetail connector of the capacitor module for fixation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A capacitor for a car audio system, comprising:

a first capacitor having two electrodes, a first housing for containing said first capacitor, having a male connector and a female connector formed on an opposite side thereof so that a second housing is combinable with said first housing by an engagement of said male/female connector of said first housing and a female/male connector of the second housing; and two link bars for connecting said electrodes of said first capacitor with corresponding electrodes of a second capacitor.

2. A capacitor module for a car audio system as described in claim 1, wherein the engagement of said male connector and said female connector is a dovetail connection.

3. A capacitor module for a car audio system as described in claim 2, wherein said male/female connector is a dovetail slot and said female/male connector is a dovetail slide.

4. A capacitor module for a car audio system as described in claim 1, further comprising a cover for covering said first and second housings.

5. A capacitor module for a car audio system as described in claim 4, further comprising a protrusion link for connecting said electrodes of said capacitor to extend out of said cover.

6. A capacitor module for a car audio system as described in claim 5, wherein said cover further includes an opening for the extension of said protrusion link.

7. A capacitor module for a car audio system as described in claim 1, wherein said housing is made by extrusion.

8. A capacitor module for a car audio system as described in claim 1, further comprising a fixed base for mounting said first and second housings to a car.

* * * * *